United States Patent [19]

Hahn

[11] Patent Number: 4,945,797

[45] Date of Patent: Aug. 7, 1990

[54] AUTOMATED MULTIPLE RIP SAW FEEDING APPARATUS

[75] Inventor: Thomas W. Hahn, Lenoir, N.C.

[73] Assignee: Buss Automation, Inc., Lenoir, N.C.

[21] Appl. No.: 191,101

[22] Filed: May 6, 1988

[51] Int. Cl.⁵ .......................... B27B 5/00; B27B 27/00
[52] U.S. Cl. ....................................... 83/75.5; 83/367; 83/421; 83/422; 83/425.4; 83/520; 83/732; 83/419; 144/357; 364/474.09; 364/474.13
[58] Field of Search ............... 83/71, 364, 367, 365, 83/371, 732, 418, 421, 422, 425.3, 425.4, 436, 438, 520, 72, 467 R, 75.5, 419; 144/356, 357, 242 M; 269/303, 315, 320; 250/560; 364/474.09, 474.13

[56] References Cited

U.S. PATENT DOCUMENTS

| | | | |
|---|---|---|---|
| 1,860,340 | 5/1932 | Boggert, Jr. | 83/421 |
| 1,959,667 | 5/1934 | Grant | 83/425.4 X |
| 3,456,700 | 7/1969 | Ahlstedt. | |
| 3,495,707 | 2/1970 | Davies. | |
| 3,513,321 | 5/1970 | Sherman. | |
| 3,570,666 | 3/1971 | Decellier. | |
| 3,803,959 | 4/1974 | Rung | 83/425 X |
| 3,941,019 | 3/1976 | Baldwin et al. | 83/71 |
| 4,066,534 | 1/1978 | Arya. | |
| 4,111,412 | 9/1978 | Cathers | 83/421 X |
| 4,166,029 | 8/1979 | Rhotert. | |
| 4,185,672 | 1/1980 | Vit. | |
| 4,413,662 | 11/1983 | Gregoire et al. | 144/356 |
| 4,596,172 | 6/1986 | Visser | 83/71 |
| 4,794,963 | 1/1989 | Oppeneer | 83/71 X |

Primary Examiner—Hien H. Phan
Assistant Examiner—Eugenia A. Jones
Attorney, Agent, or Firm—Bell, Seltzer, Park & Gibson

[57] ABSTRACT

An automated multiple rip sawing apparatus is disclosed, wherein the boards are inspected at an inspection station to identify the lateral boundaries of the maximum usable clear area of each board. Each board is then delivered to an elongated saw feeding table which includes a transversely movable guide fence, and the board is then fed through a multiple rip saw having blades of differing separations, to thereby form a plurality of separate wood components. The transverse movement of the fence is automatically adjusted by a computer control, which includes the stored value of the boundaries of the maximum clear area of the board, and so that the board is ripped into the number and size of wood components which achieves a maximum yield from each board. Also, the saw feeding table includes a fixed support frame, and guide means for supporting the transverse movement of the fence while maintaining a high degree of accuracy in its alignment with respect to the fixed support frame.

18 Claims, 5 Drawing Sheets

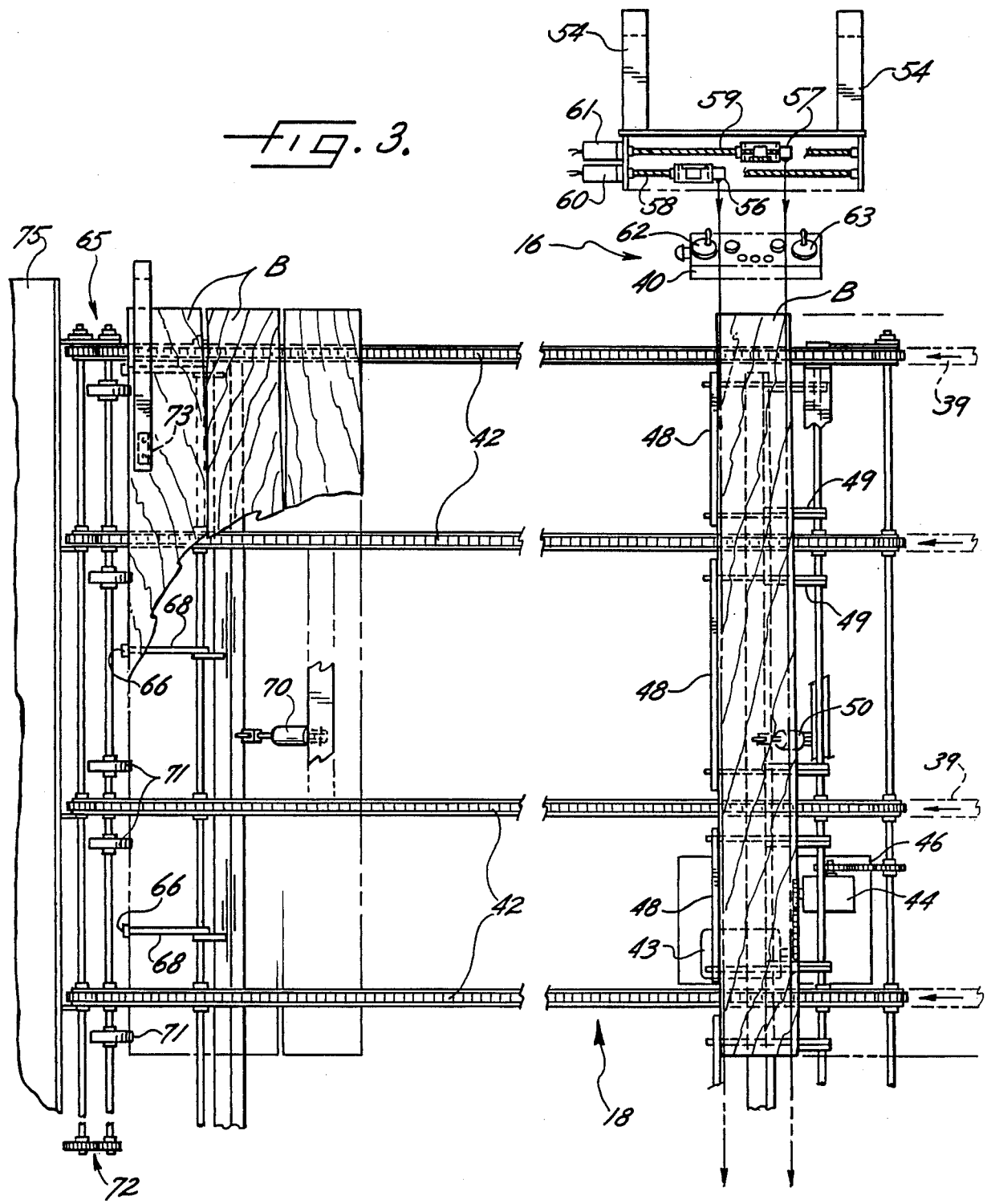

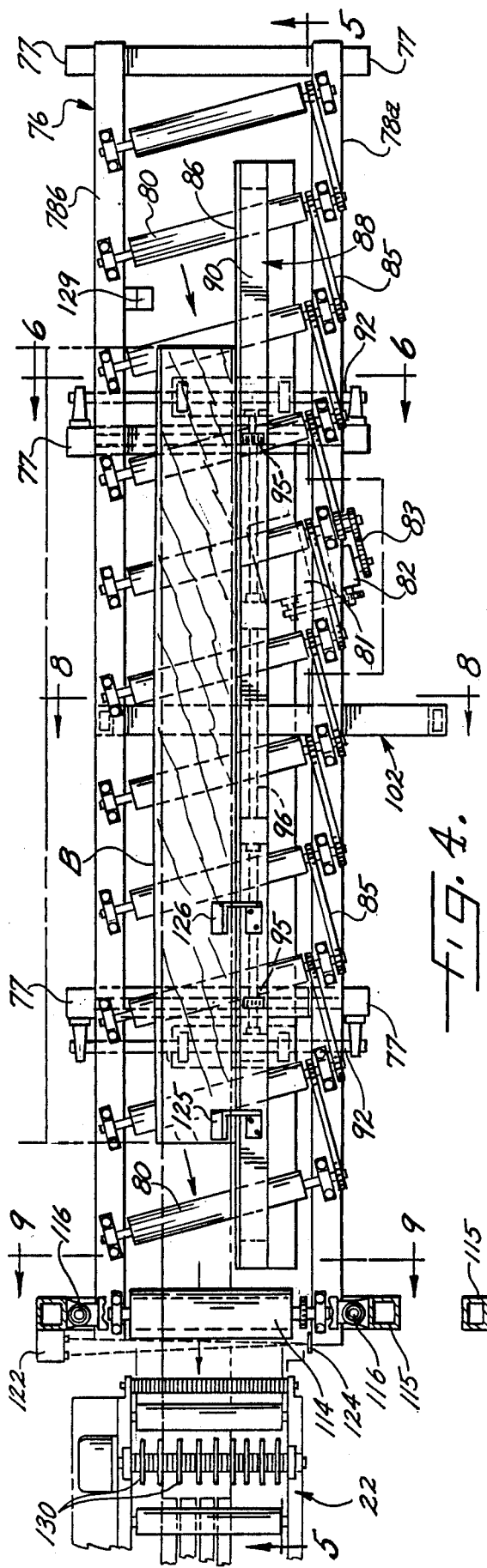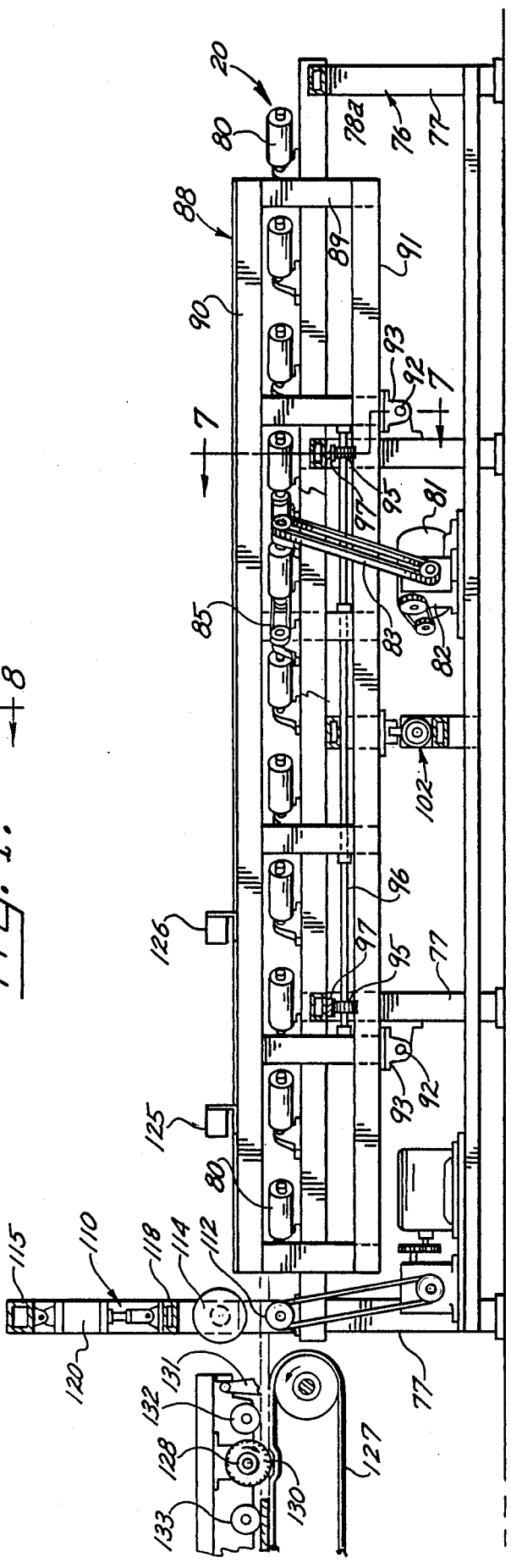

4,945,797

AUTOMATED MULTIPLE RIP SAW FEEDING APPARATUS

FIELD OF THE INVENTION

The present invention relates to an automated multiple rip saw feeding and sawing apparatus wherein the boards are inspected to identify the maximum usable clear area of each board, and the boards are then sequentially passed through a multiple rip saw to form a plurality of components.

BACKGROUND OF THE INVENTION

Many high quality manufactured wood products require the use of wood components which are free of any imperfections, such as knots, splits, bowed edges, or the like. Thus it is conventional practice to manually inspect each board to locate any such imperfections, and to then manually pass the boards through a rip saw so as to remove the portion of the board containing the imperfection. As a result, a substantial portion of many of the boards becomes waste.

In one prior inspection and sawing process which is intended to reduce the waste, each board is delivered to an inspection station where a pair of parallel lines of laser light are projected so as to extend longitudinally along the length of the board. The positioning of the light lines are manually adjusted in the lateral direction, so that the operator is able to define one straight side edge of the board and the maximum clear area of the board from the identified straight side edge. The board is then delivered to a saw feeding table which is designed to support the board as it is fed longitudinally through a multiple rip saw. The saw feeding table includes provision for projecting a second pair of lines of laser light onto the saw feeding table in accordance with the setting provided by the operator at the inspection station for each board. The lines projected onto the saw feeding table are then used by a second operator at the saw feeding station to laterally position a movable guide fence, which is designed to engage one side edge of the board and which thereby serves to guide the board in its longitudinal advance through the multiple rip saws and so as to achieve the most effective use of the identified clear area of the board.

While the above system of inspection and sawing of the boards is reasonably effective in reducing waste, it is labor intensive in that two operators are required, and it is expensive in that two laser light systems are required. It is accordingly an object of the present invention to provide an automated rip saw feeding apparatus which is able to avoid the above noted disadvantages and limitations of the prior system, and which is able to maximize the yield of the boards.

It is a more particular object of the present invention to provide an automated multiple rip saw feeding apparatus wherein each board to be cut into components is automatically aligned with a multiple rip saw so as to maximize the yield of the board.

It is also an object of the present invention to provide a saw feeding table of substantial longitudinal length, and which is able to transversely align boards sequentially delivered thereto in a rapid and highly accurate manner, and to maintain the accuracy of the alignment as the board is fed into the saw.

SUMMARY OF THE INVENTION

These and other objects and advantages of the present invention are achieved in the embodiment illustrated herein by the provision of an automated multiple rip sawing apparatus which comprises a board inspection station for sequentially receiving elongate boards at a fixed location thereon, means for identifying and storing the lateral boundaries of the maximum clear area of the board, a saw feeding table defining a longitudinal direction and adapted to sequentially receive the boards from the inspection station with the boards aligned with the longitudinal direction, multiple rip saw means including a plurality of laterally spaced apart blades and positioned adjacent and in longitudinal alignment with the saw feeding table, and means for longitudinally conveying each board from the saw feeding table through the multiple rip saw means. Computer control means is also provided, for automatically adjusting the lateral positioning of each board received at the saw feeding table so as to longitudinally align each board with the multiple rip saw means, and with the alignment being determined by the stored lateral boundaries for such board and a predetermined program designed to maximize the yield of each board upon being rip cut in the multiple rip saw means.

In the preferred embodiment of the invention, the saw feeding table comprises a longitudinally extending fixed support frame defining an upper longitudinally extending horizontal support surface, a longitudinally extending guide fence positioned above said support surface and adapted to engage one side edge of each board received thereon, and means mounting the guide fence to the support frame so as to permit adjustable movement thereof in a transverse direction which is perpendicular to the longitudinal direction. The mounting means for the guide fence comprises (a) a framework fixedly mounted to the guide fence, (b) first guide means comprising a pair of transversely extending and longitudinally separated guide rods fixedly mounted to one of said support frame and said framework, and a pair of sleeve bearing means fixedly mounted to the other of said support frame and said framework and operatively surrounding respective ones of said guide rods, whereby the guide rods and sleeve bearing means are adapted to slide relative to each other in said transverse direction, and (c) second guide means comprising a pair of longitudinally separated and rotatably interconnected gears mounted to one of said support frame and said framework and so as to be rotatable in unison about a common longitudinal axis, and a pair of racks fixedly mounted to the other of said support frame and said framework, and with said racks extending in said transverse direction and operatively meshing with respective ones of said gears, whereby the meshing engagement of said gears and racks assists in maintaining relative alignment of the framework and support frame during transverse sliding of the framework.

The table also includes drive means for selectively moving the framework and thus the guide fence in opposite transverse directions. This drive means comprises electric drive cylinder means interconnected between the support frame and the framework, with the electric drive cylinder means comprising a housing fixedly mounted to one of said support frame and said framework, a lead screw rotatably mounted in said housing and extending in said transverse direction, a roller nut threadedly mounted to said lead screw and connected to the other of said support frame and said framework, and a reversible electric drive motor mounted in said housing and operatively connected to said lead screw.

BRIEF DESCRIPTION OF THE DRAWINGS

Some of the objects and advantages having been stated, others will appear as the description proceeds when taken in conjunction with the accompanying drawings, in which

FIG. 3 is a fragmentary top plan view taken substantially along the line 3—3 of FIG. 2;

FIG. 4 is a top plan view of the saw feeding station of the present invention;

FIG. 5 is a side elevation view of the saw feeding station of the present invention and taken substantially along the line 5—5 of FIG. 4;

FIG. 10 is a schematic illustration of the computer control of the present invention.

DETAILED DESCRIPTION OF THE PREFERRED EMBODIMENT

Figure 1:
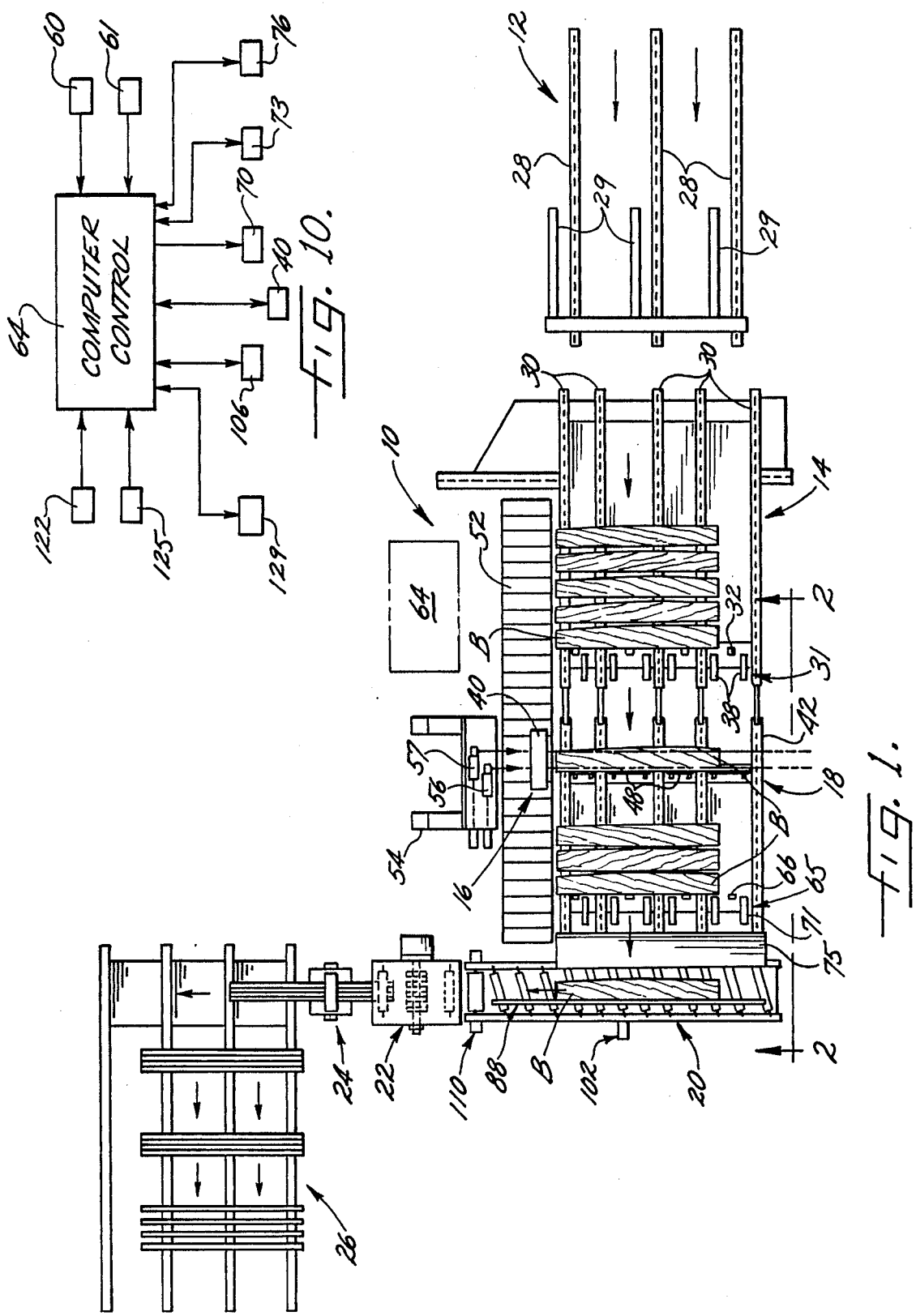
FIG. 1 is a plan view of an automated multiple rip sawing apparatus in accordance with the present invention.

Referring more particularly to the drawings, a preferred embodiment of the automated multiple rip sawing apparatus of the present invention is indicated generally at 10 in FIG. 1. Viewing the apparatus 10 in the machine or board feeding direction, the apparatus comprises an in-feed conveyor 12, a break-down conveyor 14, an inspection station 16, an accumulation conveyor 18, a saw feeding table 20, a multiple rip saw 22, a free standing pinch roll assembly 24, and a discharge or exit conveyor 26.

Referring now to the above described components in more detail, the in-feed conveyor 12 comprises three driven conveyor chains 28 which receive a plurality of boards B from a fork lift truck or the like. The downstream end of the in-feed conveyor includes pivotally mounted arms 29 which are designed to periodically convey the boards onto the upstream end of the break-down conveyor 14.

Figure 2:
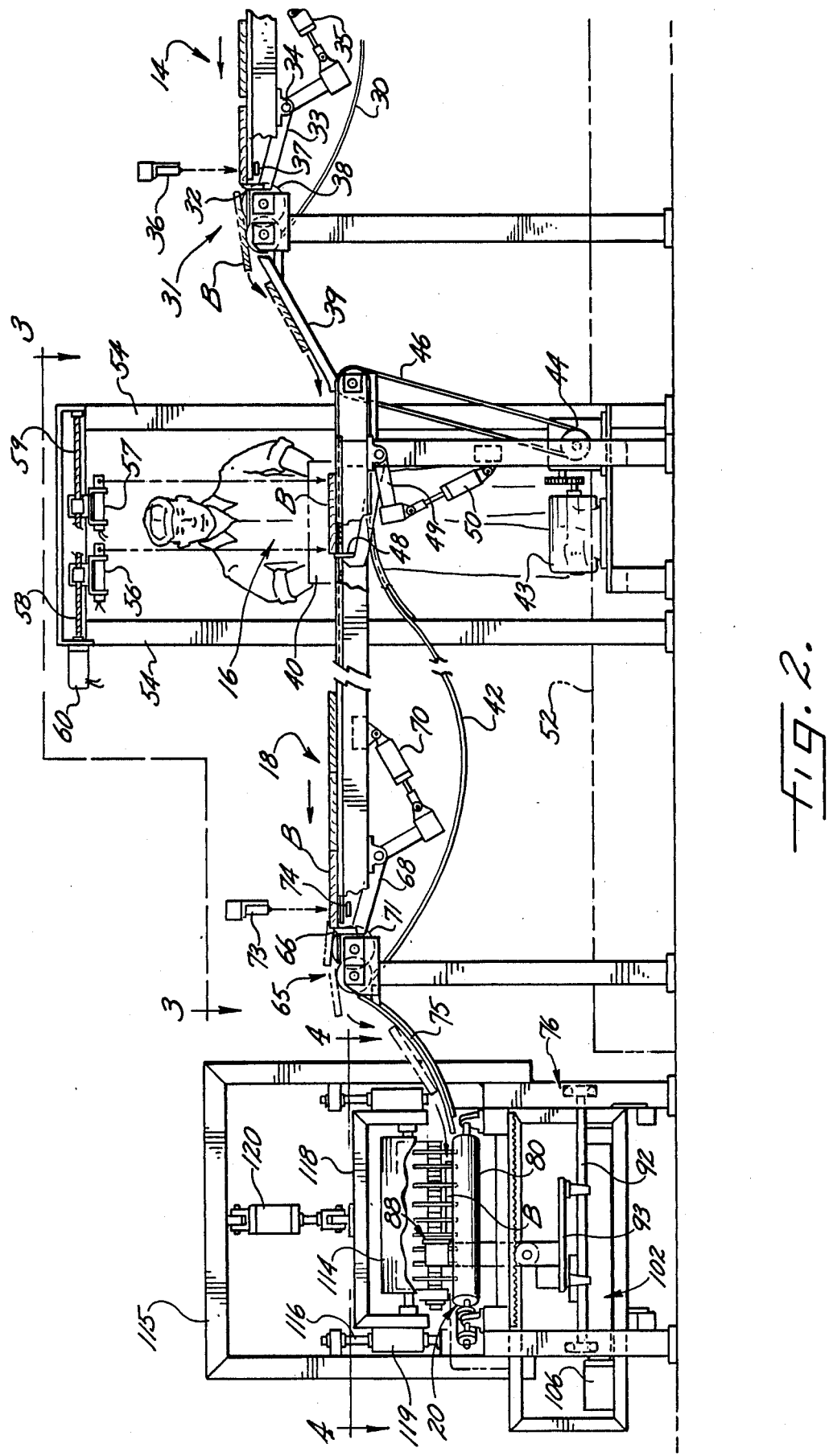
FIG. 2 is an enlarged side elevation view of the apparatus and taken substantially along the line 2—2 of FIG. 1.
Figure 6:
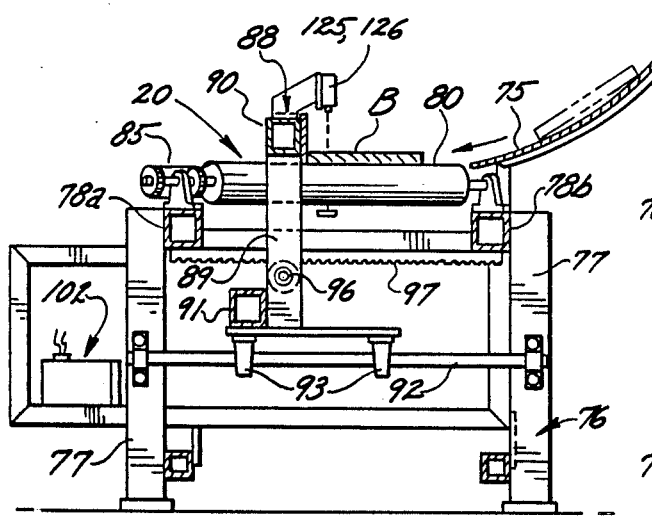
FIGS. 6-9 are sectional views taken substantially along the lines 6—6, 7—7, 8—8, and 9—9 respectively in FIGS. 4 and 5.
Figure 7:
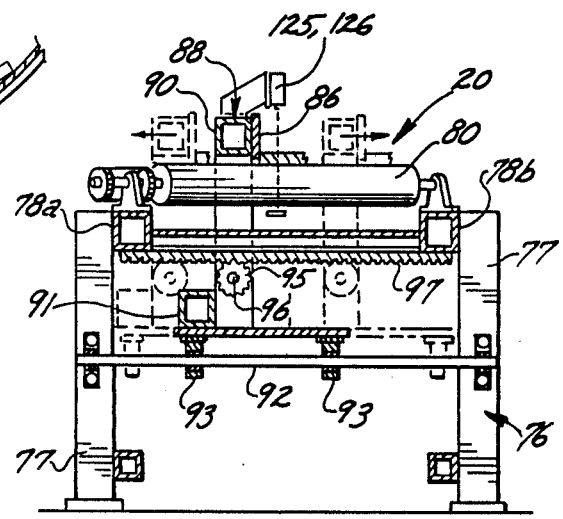

The break-down conveyor 14 includes five driven conveyor chains 30, with an individual board dealer system 31 (FIG. 2) at the downstream end. The board dealer system 31 includes transverse fingers 32 which are mounted for pivotal movement between the raised position as shown in FIG. 2 for engaging the edge of the adjacent board, and a lowered position (not shown) which releases the board. This pivotal movement is controlled by an arm 33 which mounts the fingers 32 at one end thereof, with the arm 33 being pivotally connected to the frame of the apparatus at 34. The other end of the arm 33 is connected to a pneumatic cylinder 35. Also, a photocell 36, which comprises a light emitter, is positioned above the conveyor 14 adjacent the fingers 32, and a sensor 37 is disposed below the photocell. Further, there are provided a plurality of coaxial speed-up dealer wheels 38 at the downstream end of the conveyor 14 for pulling a gap between the lead board and the following boards as the lead board is released onto the declined guide surface 39 which leads to the upstream end of the accumulation conveyor 18.

To describe the operation of the board dealer system 31 in more detail, the fingers 32 are normally raised to hold the boards on the break-down conveyor 14, and when the operator desires for another board to be fed to the inspection station, a switch on the console 40 (FIG. 3) is closed which activates the cylinder 35 to release a board. The dealer wheels 38 are interconnected to the chains 30 by interengaging gears (not shown) and so as to rotate at a peripheral speed of about twice that of the chains. Thus the released lead board rapidly moves away from the following boards, and when a gap is detected between the boards by the photocell 36, the cylinder 35 is deactivated to lift the fingers 32 and catch the next board.

Each board which is released from the break-down conveyor 14 descends along the guide surface 39 and onto the accumulation conveyor 18, and so as to be conveyed to the inspection station 16. The accumulation conveyor comprises five conveyor chains 42 which are driven by the motor 43 which acts through the gear box 44 and drive chain 46.

The inspection station 16 is defined by the finger 48 which is normally in a raised position as seen in FIG. 2, and which serves to define a fixed location for the boards B at the inspection station. The finger 48 is pivotally movable between the raised position and a lowered position (not shown), by means of a pivotally mounted arm 49 and cylinder 50 which are structurally similar to the arm 33 and cylinder 35 at the end of the break-down conveyor 14.

The inspection station 16 is further composed of the console 40, which mounts the various controls which are manually operated by the operator standing on the adjacent platform 52. Also, a framework 54 extends over the operator, with the framework mounting a pair of laser light emitting devices 56, 57 of conventional design, and which emit a line of light directed toward the board. The devices 56, 57 are mounted on separate laterally extending threaded members 58, 59, and each threaded member is rotatable by a reversible electric drive motor 60, 61. The drive motors 60, 61 are in turn manually controlled by rotatable controls 62, 63 located on the console 40, so that each device 56, 57 may be moved in a lateral back and forth direction by the operator. The devices 56, 57 are oriented such that the lines of light may be directed along the length direction of the board positioned at the inspection station, and with the lines of light being laterally adjustable by moving the devices through operation of the controls 62, 63 and the motors 60, 61. This permits the operator to visually identify the lateral boundaries of the maximum clear area of the board, by positioning the lines of light so that the maximum clear area is positioned therebetween.

The drive motors 60, 61 incorporate encoders which are also electrically connected to the computer control 64 (FIG. 10) of the apparatus and which includes a conventional memory. Thus the adjusted lateral positions of the lines of light, which represent the lateral boundaries of the maximum clear area for each board, may be stored in the memory.

When the operator has completed the adjustment of the light emitting devices 56, 57, a switch on the console 40 is actuated to effect storage of the positions in the memory, and momentary actuation of the cylinder 50 to lower the fingers 48 and release the board at the inspection station.

At the downstream end of the accumulation conveyor 18, there is positioned a second board dealer system 65, which includes fingers 66 mounted to one end of a pivotal arm 68, a pneumatic cylinder 70 which is mounted to the other end of the arm, and speed-up dealer wheels 71. The arm 68, cylinder 70, and wheels 71 are structurally and functionally similar to the corresponding components of the board dealer system 31 at the end of the break-down conveyor 14, and FIG. 3 illustrates the interengaging gears 72 which serve to rotatably interconnect the wheels 71 with the chains 42 at a speed ratio of about two to one. Also, the system 65 includes a photocell emitter 73 and a sensor 74, which operates to lift the fingers 66 as further described below.

From the accumulation conveyor 18, the boards individually slide down an inclined surface 75 and onto the saw feeding table 20 which is best seen in FIGS. 4 and 5. The saw feeding table 20 comprises a longitudinally extending fixed support frame 76, composed of a number of vertical uprights 77 and two horizontal beams 78a, 78b which are joined to the upper portions of the uprights and which extend in the longitudinal direction. A plurality of longitudinally spaced apart, parallel rollers 80 are rotatably mounted upon the two beams 78a, 78b, and so as to define a longitudinally extending horizontal support surface for the boards B. The rollers 80 are oriented so that their axes are horizontal and intersect the longitudinal direction, and more particularly, such that their axes are inclined at an acute angle from a transverse direction, i.e. a direction which is perpendicular to the longitudinal direction of the beams 78a, 78b.

The rollers 80 of the saw feeding table are each rotated by a drive system which includes an electric motor 81, a gear box 82, and a drive chain 83 which is connected directly to the shaft of one of the rollers 80. The remaining rollers 80 are interconnected by drive chains 85 and pulleys as best seen in FIG. 4. The direction of rotation is such that the boards may be advanced to the left as seen in FIG. 4.

The saw feeding table 20 also includes a longitudinally extending guide fence 86 positioned above the support surface and adapted to engage one side edge of each board received thereon. The fence 86 is mounted to the support frame 76 so as to permit selective movement thereof in the transverse direction, and this mounting means comprises a rigid framework 88 fixedly mounted to the fence and which is composed of vertical beams 89 and upper and lower horizontal beams 90, 91. The framework 88 is slideably mounted to the support frame by guide means, which includes a pair of transversely extending and longitudinally separated parallel guide rods 92 which are fixedly mounted to the support frame 76, and a pair of sleeve bearings 93 which are fixedly mounted to the framework and which operatively surround respective ones of the guide rods 92. Thus the sleeve bearings are adapted to slide along the guide rods in the transverse direction.

To provide additional rigidity to the framework 88 during its transverse movement, and to keep it square with the support frame 76 during such movement, there is provided further guide means which comprises a pair of longitudinally separated and rotatably interconnected gears 95 fixedly mounted on a longitudinally extending shaft 96, with the shaft being rotatably mounted to the framework 88, so that the gears rotate in unison. Also, a pair of racks 97 are fixedly mounted to the support frame 76, with the racks extending in a transverse horizontal direction and operatively meshing with respective ones of the gears.

Figure 8:
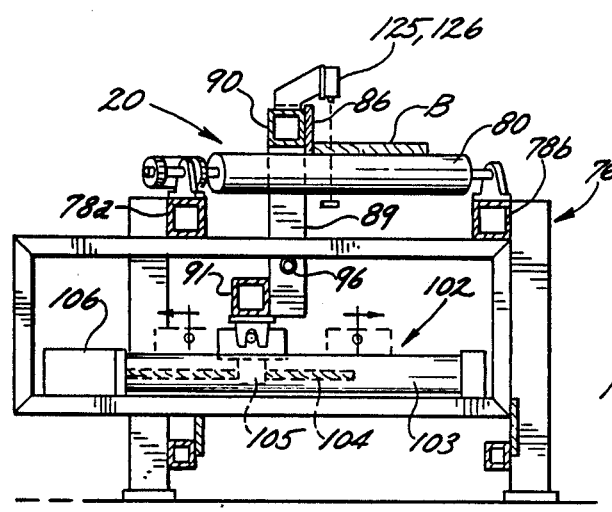
Figure 9:
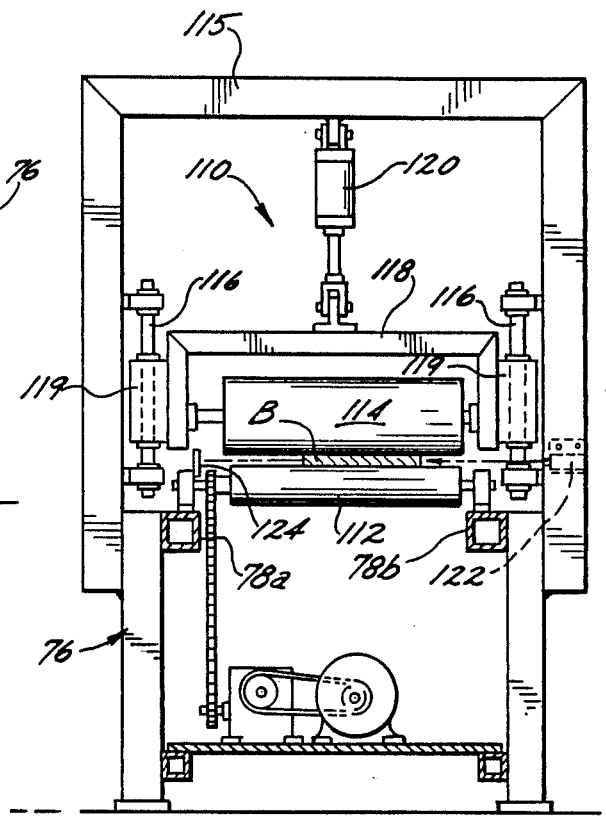

The table 20 also includes an electric drive cylinder 102 which is interconnected between the support frame 76 and the framework 88 of the saw feeding table 20, and which extends in the transverse direction. As best seen in FIG. 8, the cylinder 102 is positioned at the longitudinal center of the table 20, and it comprises a housing 103 fixed to the support frame 76, a lead screw 104 rotatably mounted in the housing and extending in the transverse direction, a roller nut 105 threadedly engaging the lead screw and connected to the framework 88, and a reversible electric drive motor 106 mounted in the housing and operatively connected to the lead screw. The motor includes a conventional encoder feedback to permit an accurate monitoring of the positioning of the nut 105, and the motor 106 is electrically connected to the computer control 64 as indicated schematically in FIG. 10. Thus the computer control is able to operate the motor 106 in either direction to effect transverse movement of the framework 88 and thus the fence 86, with the lateral positioning of the fence being accurately determined and rapidly reached. An electric cylinder of the described type is commercially available, and is sold by Origa Corporation of Elmhurst, Ill. as their Series 50 model.

A pinch roll assembly 110 is positioned at the downstream end of the saw feeding table 20, and is thus disposed between the saw feeding table 20 and the multiple rip saw 22 so as to positively advance the board therebetween. In this regard, it will be noted that the inclination of the rollers 80 of the saw feeding table 20 is such that the rotation of the rollers imparts a force component to the conveyed board which tends to hold the board against the fence 86 to thereby maintain the desired alignment of the board with the multiple rip saw as the board is longitudinally advanced therethrough.

The pinch roll assembly 110 comprises a bottom roll 112 mounted for rotation about a fixed transverse axis, and with the bottom roll being at the same elevation as the rollers 80 of the saw feeding station. The pinch roll assembly also includes a top roll 114 disposed above and parallel to the bottom roll, and pneumatic means for selectively lifting the top roll from the bottom roll so as to permit receipt of the forward end of a board therebetween. This pneumatic lifting means comprises a rigid outer frame 115 surrounding the rolls, and a pair of fixed vertical guide rods 116 mounted on opposite sides of the outer frame 115. An inner frame 118 is provided which rotatably mounts the top roll 114, and the inner frame includes mounting blocks 119 at its opposite ends which are slideably received on respective ones of the guide rods 116. Also, a pneumatic cylinder 120 is positioned between the outer frame 115 and inner frame 118, for lifting the frame 115 and thus the top roll, with the mounting blocks 119 sliding along the guide rods 116. The pinch roll assembly also includes a photocell emitter 122 which is mounted to one side of the frame 115, and a sensor 124 which is mounted adjacent the other side of the frame 115, and so that a beam of light is projected along the nip of the rolls in the absence of a board.

For control purposes, and as best seen in FIGS. 4 and 5, the guide fence 86 mounts a vertically aligned photocell assembly 125, and a second vertically aligned photocell assembly 126 which is longitudinally spaced from the first photocell assembly 125 in the rearward direction. Both of the photocells 125, 126 are positioned so that the emitted beams of light are broken by a board advancing toward the saw 22. The photocell 125 is designed to signal the computer to deliver a board to the table 20 as further described below, and the second photocell 126 is positioned to cause the cylinder 120 to lift the upper roll 114 of the pinch roll assembly when the trailing end of the advancing board clears the photocell 126. This point is determined so that at that time, the leading end of the advancing board is in the saw. Thus the pinch roll assembly 110 releases the board once sawing is commenced, so that the rolls cannot interfere with the alignment of the board.

In operation, the light beam of the photocell 122 is broken by the leading end of a board being fed toward the rip saw, and the upper roll 114 is thereby lowered. When the trailing edge of a board leaves the pinch roll assembly 110, the photocell 122 is again actuated which signals the computer control to activate the cylinder 70 and lower the fingers 66 to release the next board from the board dealer system 65. When the photocell 73 detects a gap between the delivered lead board and the following board, the cylinder 70 is deactivated to lift the fingers 66 and catch the next board at the end of the conveyor 18. The photocell 122 also acts to signal the computer control to move the fence 86 to the proper position for the particular board being delivered. The next board thus is delivered to the saw feeding table, aligned by the fence 86, and advanced through the pinch roll assembly 110 to the multiple rip saw.

The photocell 125 acts to override the photocell 122 in certain instances. Specifically, the photocell 125 acts to signal the computer control to move the fence 86 and to deliver another board to the table 20 by activating the cylinder 70, whenever the board clears the photocell 125 and the computer control determines that the fence is to move away from the board being delivered (i.e. toward the left as seen in FIG. 1). Thus these movements may commence prior to the board passing through the pinch roll assembly 110, to thereby increase the operational speed of the apparatus, since movement of the fence in the left direction will not interfere with or deflect the advancing board. Thus when the computer control determines that the next board to be delivered onto the table will require that the fence move toward the right, the photocell 125 is deactivated and the photocell 122 controls the operation of the cylinder 70 and fence 86, and it is thereby assured that the board on the table has cleared the nip roll before the next board is delivered and the fence moves. However, when the computer control senses that the fence should move toward the left as seen in FIG. 1, the photocell 125 is activated and so that a signal is sent to the cylinder 70 and the fence 86 begins to move immediately upon the board clearing the photocell 125. Thus in about one half of the deliveries, the delivery of the board and the movement of the fence is started early, which serves to significantly increase the operational efficiency of the apparatus.

The support frame 76 of the table 20 also mounts a further photocell assembly 129 (FIG. 4) which projects a vertical beam of light which is broken by the fence 86 upon the fence being moved into the right side of the table 20 as seen in FIG. 1. The photocell 129 is designed to serve as a benchmark or zero calibration position of the fence, and the computer control is programmed to send the fence to this zero position upon being initially started.

The multiple rip saw 22 is of conventional design, and it includes a driven feed chain 127, and an arbor 128 mounting a plurality of saw blades 130 in a transversely spaced apart relationship, and with the separation of the saw blades 130 being adjustable. As a typical example, the blades may be separated at varying distances, ranging from about 1 and ½ inches to about 2 and ½ inches, for the particular wood components produced by the illustrated embodiment. The rip saw also includes an anti-kick back plate 131, note FIG. 5, and a pair of guide rollers 132, 133 on opposite sides of the cutting blades 130, all of conventional design.

From the rip saw 22, the cut board components pass through the free standing pinch roll assembly 24, which is similar in construction to the pinch roll assembly 110 which is upstream of the rip saw. From the pinch roll assembly 24, the wood components are received on the exit conveyor 26, which is of conventional design.

As indicated above, the computer control 64 provides an output signal that activates the cylinder 70 of the board dealer system 65, and automatically controls the positioning of the movable guide fence 86 of the saw feeding table 20, and so as to longitudinally align each board with the multiple rip saw 22. In this regard, the positioning of the fence 86 is controlled by a program in the computer control which receives as an input the adjusted positions of the two laser lights for the board in question, and which then determines the optimum position of the fence utilizing the various actual spacings of the cutting blades 130 of the multiple rip saw, and so that the board is ripped into the number and size of wood components which achieves a maximum yield. For example, the system may be operated so that the operator at the inspection station 16 will set the right side light line (as seen by the operator) to identify the desired finished edge along the right or leading edge of the board, and the operator may then position the left light line to identify the desired finished edge along the left edge of the board. The computer control then determines the most effective portion of the rip saw to be used from the spacing between the two lines, and it utilizes the right side setting to "zero" or center the intended finished edge with the indicated blade 130 of the rip saw. By this arrangement, the yield of each board may be maximized.

While a specific embodiment of the invention has been shown and described, this was for purposes of illustration only and not for purposes of limitation, the scope of the invention being in accordance with the following claims.

I claim:

1. An automated multiple rip sawing apparatus characterized by the ability to efficiently rip boards which have identifiable lateral boundaries that define a maximum clear area of each board into a plurality of components while maximizing the yield, and comprising a board inspection station for sequentially receiving elongate boards at a fixed location thereon, means for identifying and storing the lateral boundaries of the maximum clear area of each board positioned at said inspection station, said identifying and storing means comprising means for projecting a pair of lines of light along the length direction of each board positioned at said inspection station and with the lines of light being laterally adjustable by an operator and such that the pair of lines of light may be respectively aligned with the lateral boundaries of each board and the positioning of the pair of lines of light stored for each board, saw feeding table defining a longitudinal direction and adapted to sequentially receive the boards from said inspection station with the boards aligned with said longitudinal direction, multiple rip saw means including a plurality of laterally spaced apart blades and positioned adjacent and in longitudinal alignment with said saw feeding table, means for longitudinally conveying each board from said saw feeding table through said multiple rip saw means, and computer control means for automatically adjusting the lateral positioning of each board received at said saw feeding table so as to longitudinally align each board with said multiple rip saw means, and with the alignment being determined by said stored positioning of said pair of lines of light for such board and a predetermined program designed to maximize the yield of the board upon being rip cut in the multiple rip saw means.

2. The automated multiple rip sawing apparatus as defined in claim 1 wherein said saw feeding table comprises a longitudinally extending fixed support frame, a plurality of longitudinally spaced apart, parallel rollers mounted to said support frame and so as to define a longitudinally extending horizontal support surface, and with each of said rollers being oriented in a direction which intersects said longitudinal direction, a longitudinally extending guide fence positioned above said support surface and adapted to engage one side edge of each board received thereon, and means mounting said guide fence to said support frame so as to permit adjustable movement thereof in a transverse direction which is perpendicular to said longitudinal direction.

3. The automated multiple rip sawing apparatus as defined in claim 2 wherein said means mounting said longitudinally extending guide fence to said support frame comprises a framework fixedly mounted to said fence, and means mounting said framework to said support frame so as to permit sliding movement of said framework in said transverse direction.

4. The automated multiple rip sawing apparatus as defined in claim 3 wherein said means mounting said framework to said support frame comprises a pair of transversely extending and longitudinally separated parallel guide rods fixedly mounted to one of said support frame and said framework, and a pair of sleeve bearing means fixedly mounted to the other of said support frame and said framework and operatively surrounding respective ones of said guide rods, whereby said guide rods and sleeve bearing means are adapted to slide relative to each other in said transverse direction.

5. The automated multiple rip sawing apparatus as defined in claim 4 wherein said means mounting said framework to said support frame further comprises a pair of longitudinally separated and rotatably interconnected gears mounted to one of said support frame and said framework and so as to be rotatable in unison about a common longitudinal axis, a pair of parallel racks fixedly mounted to the other of said support frame and said framework, and with said racks extending in said transverse direction and operatively meshing with respective ones of said gears, whereby the meshing engagement of said gears and racks assists in maintaining the relative alignment of said framework and support frame during transverse sliding of said framework.

6. The automated multiple rip sawing apparatus as defined in claim 3 wherein said computer control means includes electric drive cylinder means interconnected between said support frame and said framework, with said electric drive cylinder means comprising a housing fixedly mounted to one of said support frame and said framework, a lead screw rotatably mounted in said housing and extending in said transverse direction, a roller nut threadedly mounted to said lead screw and connected to the other of said support frame and said framework, and a reversible electric drive motor mounted in said housing and operatively connected to said lead screw.

7. The automated multiple rip sawing apparatus as defined in claim 2 wherein said means for longitudinally conveying each laterally adjusted board comprises drive means for positively rotating said rollers.

8. The automated multiple rip sawing apparatus as defined in claim 7 wherein said rollers are aligned along respective parallel horizontal axes which are inclined at an acute angle from said transverse direction and such that the rotation of the rollers imparts a force component to the conveyed board which tends to hold the board against said fence to thereby maintain the desired alignment of the board with said multiple rip saw means as the board is longitudinally advanced therethrough.

9. The automated multiple rip sawing apparatus as defined in claim 8 further comprising pinch roller means disposed-between said saw feeding table and said rip saw means for positively advancing the board therebetween.

10. The automated multiple rip sawing apparatus as defined in claim 9 wherein said pinch roller means comprises a bottom roll mounted for rotation about a fixed transverse axis, and with said bottom roll being at the same elevation as said rollers, a top roll disposed above and parallel to said bottom roll, and means for selectively lifting said top roll from said bottom roll so as to permit receipt of the forward end of a board therebetween.

11. The automated multiple rip sawing apparatus as defined in claim 10 wherein said pinch roll means further comprises means for positively rotating one of said top and bottom rolls.

12. A saw feeding table adapted to sequentially receive boards to be longitudinally fed into a multiple rip saw, and having provision for accurately aligning the boards received on the table, and comprising a longitudinally extending fixed support frame defining an upper longitudinally extending horizontal support surface, a longitudinally extending guide fence positioned above said support surface and adapted to engage one side edge of each board received thereon, means mounting said guide fence to said support frame so as to permit adjustable movement thereof in a transverse direction which is perpendicular to said longitudinal direction, said mounting means comprising (a) a framework fixedly mounted to said guide fence, (b) first guide means comprising a pair of transversely extending and longitudinally separated parallel guide rods fixedly mounted to one of said support frame and said framework, and a pair of sleeve bearing means fixedly mounted to the other of said support frame and said framework and operatively surrounding respective ones of said guide rods, whereby said guide rods and sleeve bearing means are adapted to slide relative to each other in said transverse direction, (c) second guide means comprising a pair of longitudinally separated and rotatably interconnected gears mounted to one of said support frame and said framework and so as to be rotatable in unison about a common longitudinal axis, and a pair of parallel racks fixedly mounted to the other of said support frame and said framework, and with said racks extending in said transverse direction and operatively meshing with respective ones of said gears, whereby the meshing engagement of said gears and racks assists in maintaining the relative alignment of said framework and support frame during transverse sliding of said framework, and drive means for selectively moving said framework and thus said guide fence in opposite transverse directions.

13. The saw feeding table as defined in claim 12 wherein said drive means comprises electric drive cylinder means interconnected between said support frame and said framework, with said electric drive cylinder means comprising a housing fixedly mounted to one of said support frame and said framework, a lead screw rotatably mounted in said housing and extending in said transverse direction, a roller nut threadedly mounted to said lead screw and connected to the other of said support frame and said framework, and a reversible electric drive motor mounted in said housing and operatively connected to said lead screw.

14. The saw feeding table as defined in claim 13 further comprising a plurality of longitudinally spaced apart, parallel rollers mounted to said support frame and so as to define said longitudinally extending horizontal support surface, and with each of said rollers being oriented in a direction which intersects said longitudinal direction.

15. The saw feeding table as defined in claim 14 further comprising means for positively rotating said rollers so as to longitudinally convey a board received on said support surface.

16. The saw feeding table as defined in claim 15 wherein said rollers are aligned along respective parallel horizontal axes which are inclined at an acute angle from said transverse direction and such that the rotation of the rollers imparts a force component to the conveyed board which tends to hold the board against said fence to thereby maintain the desired alignment of the board as the board is longitudinally advanced from the table.

17. The saw feeding table as defined in claim 16 further comprising pinch roller means mounted transversely across said table at the downstream end thereof for positively advancing the board from the table, said pinch roller means comprising a bottom roll mounted for rotation about a fixed transverse axis, and with said bottom roll being at the same elevation as said rollers, a top roll disposed above and parallel to said bottom roll, and means for selectively lifting said top roll from said bottom roll so as to permit receipt of the forward end of a board therebetween.

18. The saw feeding table as defined in claim 17 wherein said pinch roll.means further comprises means for positively rotating one of said top and bottom rolls.

* * * * *